United States Patent [19]
Griffith et al.

[11] Patent Number: 5,560,676
[45] Date of Patent: Oct. 1, 1996

[54] DESK FOR USE IN VEHICLE

[76] Inventors: Stephen T. Griffith, 4915 Climbing Vine Pl.; Wayne Roberts, 4914 Climbing Vine Pl., both of Marietta, Ga. 30066

[21] Appl. No.: 370,405

[22] Filed: Jan. 9, 1995

[51] Int. Cl.⁶ ........................................... A47C 7/62
[52] U.S. Cl. ................. 297/188.2; 108/44; 297/135; 224/539; 224/275
[58] Field of Search ................ 108/44, 42, 25, 108/26, 26.2; 297/135, 188.01, 188.2; 224/400, 275, 564, 276, 549, 560, 539; 296/37.1, 37.4

[56] References Cited

U.S. PATENT DOCUMENTS

| | | | |
|---|---|---|---|
| 3,330,227 | 7/1967 | Yachuk | 108/44 |
| 4,512,503 | 4/1985 | Gioso | 297/188.2 X |
| 4,765,583 | 8/1988 | Tenner | 224/275 X |
| 4,832,241 | 5/1989 | Radcliffe | 108/44 X |
| 4,909,159 | 3/1990 | Gonsoulin | 108/44 |
| 4,946,120 | 8/1990 | Hatcher | 108/44 X |
| 5,170,720 | 12/1992 | Scheurer | 297/135 X |
| 5,370,060 | 12/1994 | Wang | 108/44 |
| 5,390,608 | 2/1995 | McLaren et al. | 108/44 |

FOREIGN PATENT DOCUMENTS 2677236  12/1992  France ..................... 108/42

*Primary Examiner*—Peter M. Cuomo
*Assistant Examiner*—Janet M. Wilkens
*Attorney, Agent, or Firm*—James B. Middleton

[57] ABSTRACT

A desk for use in a vehicle has a top that defines receptacles therein for holding office supplies and equipment. The desk is mounted in the passenger seat and held by the normal lap belt of the vehicle supports are adjustable to allow the height of the top of the desk to be varied, and to allow leveling of the desk. A slide is movable from the top so the slide can extend towards the driver's seat, and the slide is adapted to receive a portable computer. One corner of the desk mounts a cup holder to be adjacent to the driver, and a holder for eyeglasses is adjacent to the cup holder.

7 Claims, 2 Drawing Sheets

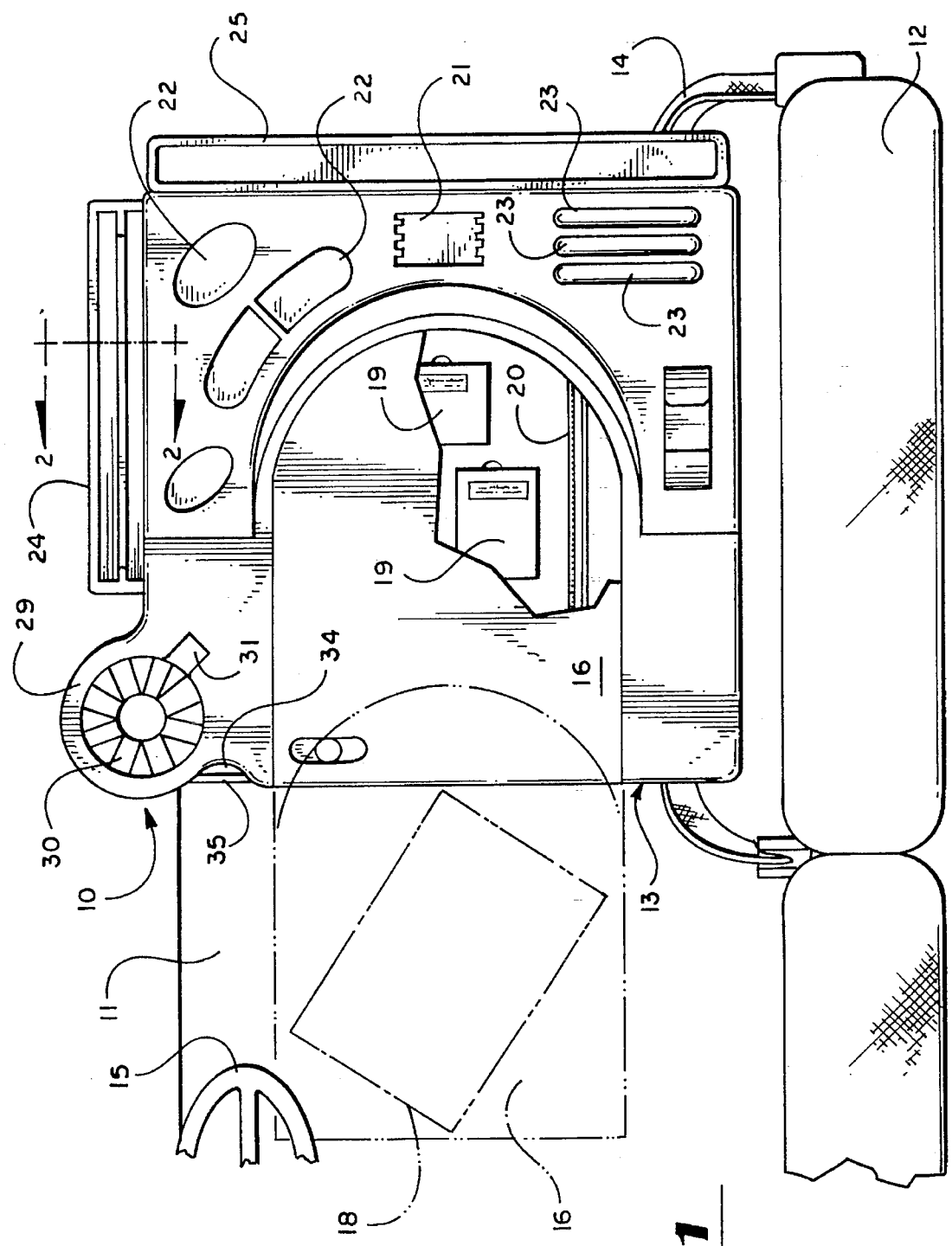

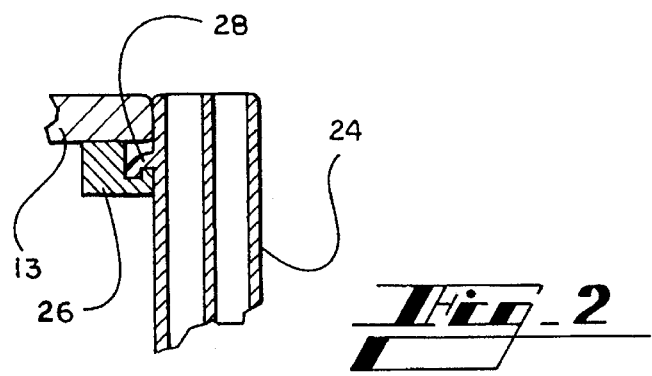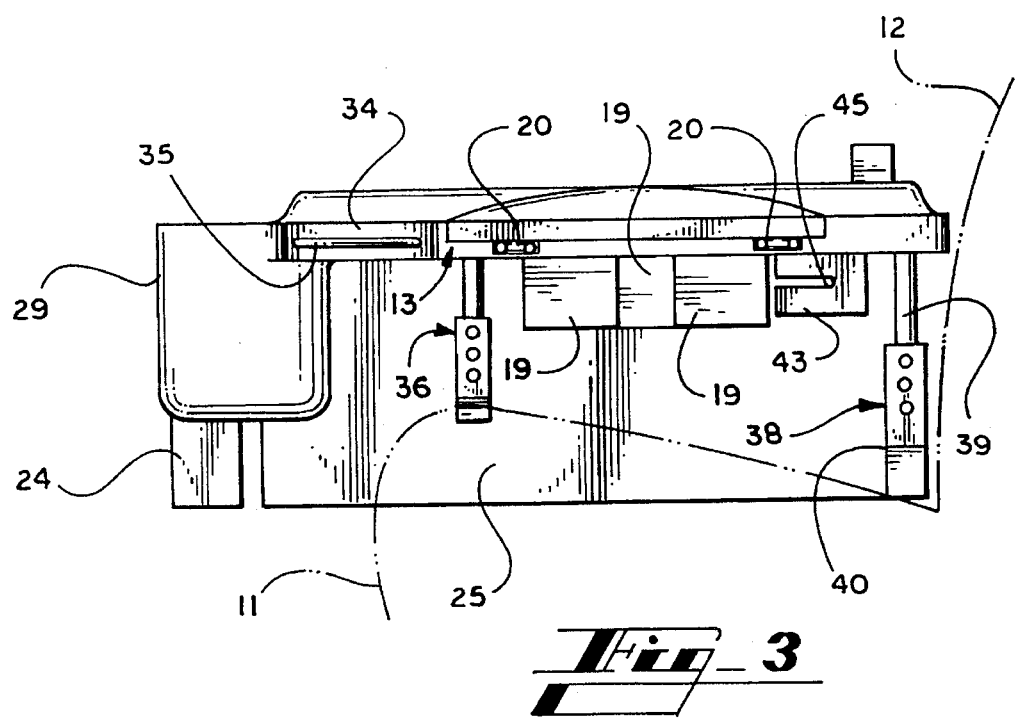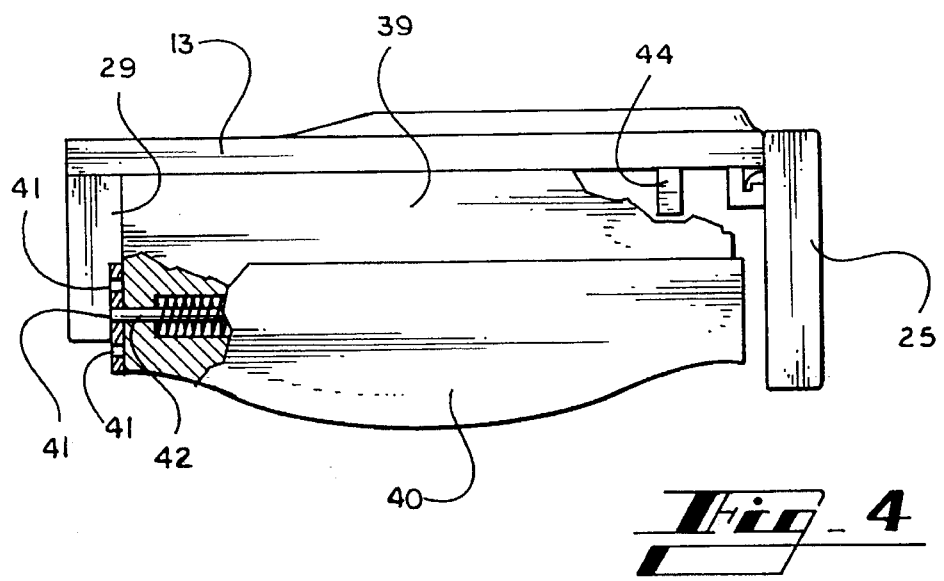

DESK FOR USE IN VEHICLE

BACKGROUND OF THE INVENTION

1. Field of the Invention

This invention relates generally to desks and the like, and is more particularly concerned with a desk for use in a motor vehicle.

2. Discussion of the Prior Art

It is well known that many people handle certain clerical jobs and the like while in an automobile, truck or other vehicle. Commonly, one simply uses a clip-board or the surface of a brief case as a desk, but such expedients do not provide truly desirable working surfaces.

There have been several efforts at providing a desk for use in a vehicle. These prior efforts include: desks that are supported by the vehicle seat, such as U.S. Pat. Nos. 3,031,242 and 3,922,973; desks that are supported from the floor of the vehicle, such as U.S. Pat. Nos. 3,345,118 and 5,085,153; and, desks that are supported by both, such as U.S. Pat. No. 2,934,391. Many of these prior art desks are simply too large for many of today's vehicles, and still do not provide the convenience needed in today's business environment. Other prior art desks are little more than writing surfaces mounted in a vehicle. Even prior art desks that attempt to provide some storage space do not have spaces arranged to provide a convenient, organized mobile desk such as is needed by many people who work primarily from their vehicle.

Recently, with the popularity of portable, or "lap-top", computers, sales people and the like rely heavily of such a computer while on the road. The use of the computer, with related accessories such as facsimile transmission devices and mobile telephones, makes the vehicle a virtual rolling office, but there has been no desk to facilitate the use of this equipment.

SUMMARY OF THE INVENTION

The present invention provides a desk carried by the passenger seat in a motor vehicle. The desk includes appropriate receptacles for conventional office requisites, and is especially designed for use by a person using a portable electronic computer. The top, or working surface of the desk includes a slide that may carry a computer, the slide being selectively movable to dispose the surface conveniently adjacent to the driver. The desk has variable height support means both to level the desk with respect to the vehicle, and to vary the height of the working surface. Clips carried by the desk of the present invention allow the conventional seat belt to retain the desk in position.

BRIEF DESCRIPTION OF THE DRAWINGS

These and other features and advantages of the present invention will become apparent from consideration of the following specification when taken in conjunction with the accompanying drawings in which:

FIG. 1 is a top plan view showing a desk made in accordance with the present invention, the desk being shown installed on a vehicle seat;

FIG. 2 is a fragmentary cross-sectional view taken along the line 2—2 in FIG. 1;

FIG. 3 is a side elevational view of the desk shown in FIG. 1; and,

FIG. 4 is a rear elevational view of the desk shown in FIG. 1, portions thereof being broken away to illustrate the construction.

DETAILED DESCRIPTION OF THE EMBODIMENT

Referring now more particularly to the drawings, and to that embodiment of the invention here presented by way of illustration, FIG. 1 shows a top plan view of a desk 10, the desk being installed in a car seat 11 having a back rest 12. The conventional car seat belt, and specifically the lap belt, is indicated at 14 and serves to hold the desk 10 in place on the seat 11.

It will be understood that the desk 10 is installed in the passenger seat of the vehicle, the desk being for use by the driver. A portion of the steering wheel is shown at 15 to indicate the relationship of the desk 10 to the driver. In this connection, one important feature of the present invention is a slide 16 that is selectively movable towards the driver of the vehicle. Thus, when the slide 16 is retracted, within the confines of the desk top 13, the desk in no way obstructs the driver of the vehicle, but is close enough that the desk can be reached conveniently when desired. When the slide 16 is moved laterally to the position shown in phantom, the slide is a work surface positioned for convenient use by the driver. A portable computer 18 is also shown in phantom. The desk of the present invention is designed with the user of a portable computer in mind, but it will be understood that the slide 16 may equally well provide a writing surface, space for a dictating machine, or the like.

Beneath the slide 16, and accessible when the slide 16 is moved to the position shown in phantom, there is storage space indicated at 19. It will be realized that the storage space 19 may be utilized for many items, but it is contemplated that the storage spaces 19 will be sized to receive 3½ inch floppy disks for use with the computer 18.

Since the slide 16 is partially broken away in FIG. 1, a bearing 20 is shown. The bearing 20 is a conventional device that will be well understood without further discussion, but the slide 16 may utilize one or a plurality of the bearings 20. As is shown in FIG. 3 of the drawings, the embodiment here presented has two bearings 20, allowing storage space 19 between the bearings 20, and providing good stability to the slide 16.

Looking more generally at the desk shown in FIG. 1 of the drawings, it will be seen that the desk 10 is designed for organization of needed items, and for convenient use thereof. There is a recess 21 generally centrally of the right side of the desk in the top 13, the recess 21 being here shown as arranged to receive 3½ inch floppy disks. This convenient location may hold frequently used disks, and longer-term storage can be in the receptacles 19. In the right rear corner of the desk top 13, there is a plurality of slots 23 to receive pens, pencils and the like. In the forward right corner there are several recesses 22 that may receive paper clips and other small items. Also, one of the recesses may receive a mobile telephone, or other equipment and accessories that may be needed by the driver.

For convenience, the terms "front", "back" etc. related to the desk of the present invention are used as the desk is installed in a vehicle. Thus, the front of the desk 10 is towards the front of the vehicle, and the back of the desk is towards the back of the vehicle. The left side is towards the driver, and the right side is towards the passenger side of the vehicle.

As here shown, there are two file pockets fixed to the desk 10. At the front edge of the desk 10 there is a pocket 24 to receive file folders and other papers or the like; and, at the right-hand edge of the desk 10 there is a pocket 25. The pocket 24 is shorter than the pocket 25, and may receive letter-size files while the pocket 25 receives legal-size files.

Both the pockets 24 and 25 are selectively removable, so one may use one, both or none. Also, the file pocket 25 can be shorter if desired. Looking at FIG. 2 of the drawings, it will be seen that the desk top 13 carries a rail 26. A complementary rail 28 is fixed to the pocket 24 so the pocket 24 is removably carried by the desk 10. The pocket 25 is mounted by a similar arrangement as shown in FIG. 4, but the description will not be repeated.

With attention to the front left corner of the desk 10 in FIG. 1 of the drawings, there is a cup holder 29. The cup holder 29 is simply a cylindrical receptacle having a plurality of flexible fingers 30 therearound for supporting a cup or glass that does not totally fill the receptacle. Also, as here shown, a rectangular opening 31 will receive a handle on a cup so either handled or non-handled cups can be used in the holder 29. The position of the holder 29 is convenient to the driver of the vehicle while driving, though it may be placed elsewhere if preferred.

The cup holder 29 extends somewhat beyond the boundaries of the desk top 13, yielding a circular corner on the desk. While the specific shape is a matter of design choice, the circular shape is used to provide an eyeglass holder. On the left-hand edge of the desk top 13, the circle of the cup holder 29 extends into the top 13, providing an indentation 34. A pin 35 spans the indentation 34. Thus, a temple piece of a pair of eyeglasses can be slipped behind the pin 35. The pin 35 will then receive the hinge of the temple piece to support the eyeglasses.

Looking now at FIGS. 3 and 4 of the drawings, the adjustable support means for the desk 10 are shown. The seat 11 is shown in phantom, and it will be understood that the seat 11 will generally be higher in the front than in the back. As a result, the front support 36 is shorter than the rear support 38, though both supports 36 and 38 are vertically adjustable. Those skilled in the art will readily devise numerous mechanical means to provide for the desired adjustment, but as here shown there is a simple telescoping arrangement. There is a rigid member 39 fixed to the bottom of the desk top 13, and a telescoping member 40 is slidable thereon. In FIG. 4 it can be seen that the telescoping member 40 defines a plurality of holes 41 selectively to receive a spring-urged pin 42 to act as a latch. The pin 42 can be placed in any desired hole 41 to adjust the relative position of the telescoping member 40, thereby adjusting the height of the desk. Both the front and rear supports 36 and 38 are constructed alike, so the above description covers both supports.

Vehicle seats are usually concave in a lateral direction for greater comfort; therefore, the supports 36 and 38 may be convex. The rear support 38 is well shown in FIG. 4. The front support 36 will be curved less because the front of a seat is usually less concave.

To secure the desk 10 to the seat 11, it has been mentioned that the seat belt 14 is used. In FIGS. 3 and 4, there are clips 43 and 44. The clip 43 in FIG. 3 is simply a block having a slit 45 therein, the slit 45 opening to the front. The clip 44 is made the same, but only the back of the clip 44 is here shown. It should therefore be understood by those skilled in the art than one can buckle the lap belt 14; then, the belt can be inserted into the slits 45 of the clips 43 and 44. Thereafter, a jerk on the belt will cause the belt to retract and tighten to hold the desk 10 in place.

It will therefore be seen that the present invention provides a desk for use in a vehicle, the desk being conveniently located adjacent to the driver for easy access. A slide can be projected for convenient use from the driver's seat, or retracted to be out of the way during travel. The adjustable supports allow positioning of the desk to suit the individual driver, and various receptacles hold office needs.

It will of course by understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

We claim:

1. A desk for use in a vehicle, in combination with a vehicle having a driver's seat, a passenger seat adjacent to said driver's seat, and a seat belt for said passenger seat, said desk comprising a top, adjustable supports extending from said top and supporting said desk on said passenger seat, and at least one clip for receiving said seat belt so that said seat belt holds said desk on said passenger seat, said desk further including a slide movably carried by said top, said slide selectively extending towards said driver's seat, wherein said top defines at least one storage receptacle beneath said slide when said slide is retracted towards said passenger seat, and said desk includes a rail along at least one edge thereof and a file pocket removably carried by said rail, and wherein said top defines a plurality of recesses for receiving office supplies, and wherein said adjustable supports comprise a front support and a rear support, said rear support having a convex lower edge for substantially conforming to said passenger seat.

2. The combination as claimed in claim 1, and further including latching means for selectively fixing the height of said adjustable supports.

3. The combination as claimed in claim 1, said at least one clip defining a horizontally extending slot for receiving said seat belt, said slot opening towards the front of said vehicle.

4. A desk for use in a vehicle, in combination with a vehicle having a driver's seat, a passenger seat adjacent to said driver's seat, and a seat belt for said passenger seat, said desk comprising a top, adjustable supports extending from said top to said passenger seat for supporting said desk on said passenger seat, at least one clip for receiving said seat belt so that said seat belt holds said desk on said passenger seat, and including a slide movably carried by said top, said slide selectively extending towards said driver's seat, said top defining at least one storage receptacle beneath said slide when said slide is retracted towards said passenger seat, said top further defining at least one receptacle adjacent to said slide, said top further defining an indentation in an edge thereof, and including a pin extending across said indentation so that a temple piece of a pair of eyeglasses is receivable over said pin for supporting said eyeglasses.

5. The combination as claimed in claim 4, said desk further including means along at least one edge thereof for supporting a file pocket, and a file pocket removably carried by said means for supporting a file pocket.

6. The combination as claimed in claim 5, wherein said top defines a plurality of recesses for receiving office supplies.

7. The combination as claimed in claim 4, and including a cup holder defined by said top, said cup holder including a circular corner of said top and defining a cup receiving opening therein, said cup holder being adjacent to said driver's seat.

* * * * *